(12) United States Patent
Manolov et al.

(10) Patent No.: US 7,653,628 B2
(45) Date of Patent: Jan. 26, 2010

(54) PERSISTENT DATA MANAGEMENT WITH DIFFERENT ISOLATION LEVELS

(75) Inventors: Svetoslav Manolov, Sofia (BG); Ivo Simeonov, Sofia (BG)

(73) Assignee: SAP AG, Walldorf (DE)

( * ) Notice: Subject to any disclaimer, the term of this patent is extended or adjusted under 35 U.S.C. 154(b) by 509 days.

(21) Appl. No.: 10/836,693

(22) Filed: Apr. 30, 2004

(65) Prior Publication Data

US 2007/0162449 A1    Jul. 12, 2007

(51) Int. Cl.
*G06F 17/30* (2006.01)

(52) U.S. Cl. .......................... 707/8; 707/103; 711/133; 711/141

(58) Field of Classification Search ................ 707/103, 707/8; 711/141
See application file for complete search history.

(56) References Cited

U.S. PATENT DOCUMENTS

| | | | |
|---|---|---|---|
| 6,557,082 B1* | 4/2003 | Josten et al. | 711/141 |
| 2004/0205066 A1* | 10/2004 | Bhattacharjee et al. | 707/8 |
| 2004/0267807 A1* | 12/2004 | Barabas et al. | 707/103 R |

* cited by examiner

*Primary Examiner*—Don Wong
*Assistant Examiner*—Sheree N Brown

(57) ABSTRACT

A method is described for managing an application's cached persistent data with different isolation levels. The different isolation levels include: 1) requesting a lock for a first item of database data in response to the first item of database data not being cached and not yet having been used by the application; 2) requesting a lock for a second item of cached database data in response to the second item of database data being updated for a first time by the application; and, 3) requesting a lock for a third item of cached database data in response to it being confirmed that the third item of database data will need to be updated in its database.

8 Claims, 10 Drawing Sheets

PERSISTENT DATA MANAGEMENT WITH DIFFERENT ISOLATION LEVELS

FIELD OF INVENTION

The field of invention is related generally to enterprise software; and, more specifically, to persistent data management with different isolation levels.

BACKGROUND

Distributed Transactions

The information systems of a modern day enterprise (such as a corporation or government institution) are often responsible for managing and performing automated tasks upon large amounts of data. Persistent data is that data that "exists" for extended periods of time (i.e., "it persists"). Persistent data is typically stored in a database so that it can be accessed as needed over the course of its existence. Here, complex "database software" (e.g., such as DB2, Oracle, and SQL Server) is often used to actually read the data and perhaps perform various intelligent functions with it. Frequently, persistent data can change over the course of its existence (e.g., by executing a series of reads and writes to the data over the course of its existence). Moreover, multiple items of different persistent data may change as part of a single large scale "distributed transaction".

A distributed transaction is a transaction that involves more than one database or server. Distributed transactions frequently involve multiple databases accessed through multiple servers that are interconnected by a network. Because of the use of multiple databases, distributed transactions are an attempt at some sort of comprehensive function that serves the enterprise's needs. For example, in the case of an airline, a single distributed transaction might be used to manage an internet connection to a potential customer who may reserve a particular seat on a particular flight. Here, note that a number of different databases may be involved in a single distributed transaction that is executed for the customer's experience with the airline's on-line ticketing and reservation system.

For example, assume the distributed transaction is expected to: 1) provide the potential customer with flight scheduling, pricing and seating information; 2) record the customer's name, address, credit card, and email information if any flight is reserved by the customer; 3) update the seating information for each seat reserved by the customer; 4) update the customer's frequent flier mileage records if the customer is registered in the airline's frequent flier program; 5) update the airline's accounting records to reflect the new revenue introduced by each flight reservation made by the customer; and, 6) invoice the customer using the customer's credit card information.

Here, a number of different databases may be involved in the distributed transaction such as: 1) a first database that keeps track of the airline's flight scheduling information; 2) a second database that keeps track of information specific to a particular flight such as seating information; 3) a third database that keeps track of flight pricing information; 4) a fourth flight that keeps track of each customer's name, address and email information; 5) a fifth database that keeps track of each frequent flier's mileage; 6) a sixth database that keeps track of the airline's accounting records; and 7) a seventh database that keeps track of the airline's invoicing records.

FIGS. 1a and 1b depict how a distributed transaction is typically carried out by an enterprise's information system infrastructure. A protocol, referred to as the "two-phase commit" protocol is used to ensure that either a distributed transaction's database updates are successfully completed in their entirety; or, the distributed transaction is not effected at all. By ensuring that database updates for a distributed transaction are either completely carried out or not carried out at all, incorrect database records are avoided (e.g., a seat being reserved for a reservation that is not actually made, a seat not being reserved for a reservation that is actually made, etc.). FIG. 1a corresponds to a two-phase commit protocol in which all of distributed transaction's database updates are recorded. FIG. 1b corresponds to a two-phase commit protocol in which none of distributed transaction's database updates are recorded.

The example of FIG. 1a shows four servers $101_1$ through $101_4$, each coupled to its own corresponding database $102_1$ through $102_4$; where, each of the databases is to be updated with new information upon completion of the distributed transaction's various calculations. That is, first a distributed transaction performs its various tasks and calculations with the data that it uses; then, upon completion of these tasks and calculations, the distributed transaction's databases are updated with any updates needed to be made to their respective data as a consequence of the distributed transaction's full execution.

Each server $101_1$ through $101_4$ includes its own resource manager module $103_1$ through $103_4$ that is responsible for communicating with a particular database. The resource manager can often be viewed as driver software that is used to send specific functional commands to the database software in response to requests/commands made by higher level software functions. The commands sent to a database are typically scripted in some form of database language (e.g., Structured Query Language (SQL)). Examples of resource managers include a Java Database Connectivity (JDBC) driver that is presently part of the J2EE platform and an Open Database Connectivity (ODBC) driver provided by Microsoft Corporation.

A transaction manager module 104 is responsible for, typically among other responsibilities, implementing the two-phase commit protocol with those resource managers that communicate to a database that is to be updated after a distributed transaction's calculations have been executed. In the examples of FIGS. 1a and 1b, each of databases $102_1$ through $102_4$ are assumed to require some portion of their data to be changed as a consequence of the distributed transaction's completed execution. The transaction manger 104 therefore coordinates a sequence of messaging exchanges between itself and resource managers $103_1$ through $103_4$. Examples of transaction manager modules include the API and logic behind the Java Transaction API (JTA) that is part of the J2EE platform and the Microsoft Distributed Transaction Coordinator (MDTC) from Microsoft Corporation. A high level exemplary review of the messaging used to implement a two phase commit protocol immediately follows.

Once a distributed transaction's calculations are completed so that all database changes to be made as a consequence of the transaction's execution are known (e.g., entry of a specific reserved seat on a specific flight, etc.), the first phase of the two-phase commit protocol begins with the transaction manager 104 receiving a "commit" command 1 from another portion of the distributed transaction's software (e.g., "a client" or "container" that executes higher level functions of the distributed transaction). In response to the received "commit" command 1, the transaction manager 104 sends "prepare" commands 2 to each of the resource managers $103_1$ through $103_4$. Note that, because a network 105 resides between the server $101_1$ that contains the transaction manager 104 and servers $101_2$ through $101_4$, those of the "prepare" commands 2 that are sent to servers $101_2$ through $101_4$ pass through network 105.

In response to the received "prepare" commands 2, each resource manager forwards a "prepare" command 3 to its corresponding database in the appropriate language format (e.g., SQL). Each database $102_1$ through $102_4$ performs what is akin to a "soft write" of the new, updated information. That is, for example, each database runs through all internal routines just short of actually writing the new, updated information. If a problem is not detected by a database (e.g., an incompatibility in the data) just short of the actual write of the updated information, a database reports a "ready" response. In FIG. 1a, each database reports a "ready" response 4; and, in FIG. 1b, databases $102_1$ through $102_3$ report a "ready" response while database $102_4$ reports a "rollback" response 11.

A "rollback" response means that a database has recognized some problem in preparing itself to actually write its updated information. As a consequence, a "rollback" response essentially means that the new information cannot be written. Given that all new information of distributed transaction must be written or no new information from a distributed transaction may be written, as shall become evident in more detail immediately below, the "ready" response of each server in FIG. 1a results in all of the new information being written to each server; while, the single "rollback" response 11 in FIG. 1b results in no new information being written to any server. The situation of FIG. 1a therefore corresponds to a situation in which the distributed transaction "takes effect"; while, the situation in FIG. 1b corresponds to the distributed transaction as not being recognized as ever having being executed.

In FIGS. 1a and 1b, the responses of each of the databases $102_1$ through $102_4$ (e.g., "ready" responses 5 in FIG. 1a) are forwarded to the transaction manager by the resource managers $103_1$ through $103_4$. The reception of these responses by the transaction manager 104 marks the end of the first phase of the two-phase commit protocol.

The transaction manager's sending of a second set of messages in response to the received responses marks the beginning of the second phase. Because the transaction manager 104 receives all "ready" responses from the resource managers $103_1$ through $103_4$ in the situation of FIG. 1a, the transaction manager responds with the sending of a set of "commit" messages 6 to the resource managers $103_1$ through $103_4$. The resource managers $103_1$ through $103_4$ forward 7 the "commit" command to their respective databases $102_1$ through $102_4$ which, in turn, causes the prepared data to be actually written into each. The databases confirm that the data updates have been successfully written by sending a "committed" response 8 to their corresponding resource managers. The resource managers then forward 9 these messages to the transaction manager 104. The transaction manager 104 then responds to the original commit command 1 with a committed response 10. At this point all databases to be updated with new information are updated and the second phase of the two-phase commit protocol is complete.

In FIG. 1b, the reception of the rollback message from server $101_4$ by the transaction manager 104 causes the transaction manager 104 to send rollback messages 12 to each of the resource managers $103_1$ through $103_4$ and to inform the higher level software that the new data could not be committed 13. These rollback messages 11 are then effectively forwarded 14 to the databases $102_1$ through $102_4$; which, in turn, causes each of servers $102_1$ through $102_3$ to cancel their prepared writes of new information. As such, no new information is written into any of the databases $102_1$ through $102_4$.

Enqueue Servers

FIGS. 1a and 1b show an implementation where a single server is associated with each database. In more complicated implementations, multiple servers may be associated with each database. FIG. 2 shows an exemplary depiction in which each of N servers $201_1$ through $201_N$ are coupled to a database 202. Each of servers $201_1$ through $201_N$ are assumed to be capable of accessing database 202 so as to update information stored therein.

In an environment where multiples servers are capable of updating a same database entry, contention may arise between servers. That is, two or more servers may desire access to the same data base entry at approximately the same time for purposes of updating the same database entry with new information at approximately the same time. Generally, basic principles of database operation (collectively referred to as "ACID" principles) stipulate that database data should be not be updated with new information without the update being visible to the various applications that might use the data. Because quasi simultaneous attempts at accessing and updating a same database entry by different servers may violate these principles, contention resolution should be built into "multi-server, single database" environments.

An enqueue server 203 facilitates contention resolution for database entries. An enqueue server keeps track of the database entries of database 202 that are currently being used by an application. If an application desires to use a particular database entry, the application's server sends a message to the enqueue server 203 that effectively requests permission to obtain access to the database entry.

According to a basic embodiment of operation, if the database entry is being used by another application, the enqueue server 203 denies access to the requesting application (e.g., by sending an "exception" message to the requesting application's corresponding server); or, if the database entry is not being used by another application, the enqueue server 203 approves access to the requesting application (e.g., by sending a "approve" message to the requesting application's corresponding server). In the later case, the requesting application's corresponding server fetches the data from the database 202.

SUMMARY

A method is described for managing an application's cached persistent data with different isolation levels. The different isolation levels include: 1) requesting a lock for a first item of database data in response to the first item of database data not being cached and not yet having been used by the application; 2) requesting a lock for a second item of cached database data in response to the second item of database data being updated for a first time by the application; and, 3) requesting a lock for a third item of cached database data in response to it being confirmed that the third item of database data will need to be updated in its database.

FIGURES

The present invention is illustrated by way of example and not limitation in the figures of the accompanying drawings, in which like references indicate similar elements and in which.

Figure 3:
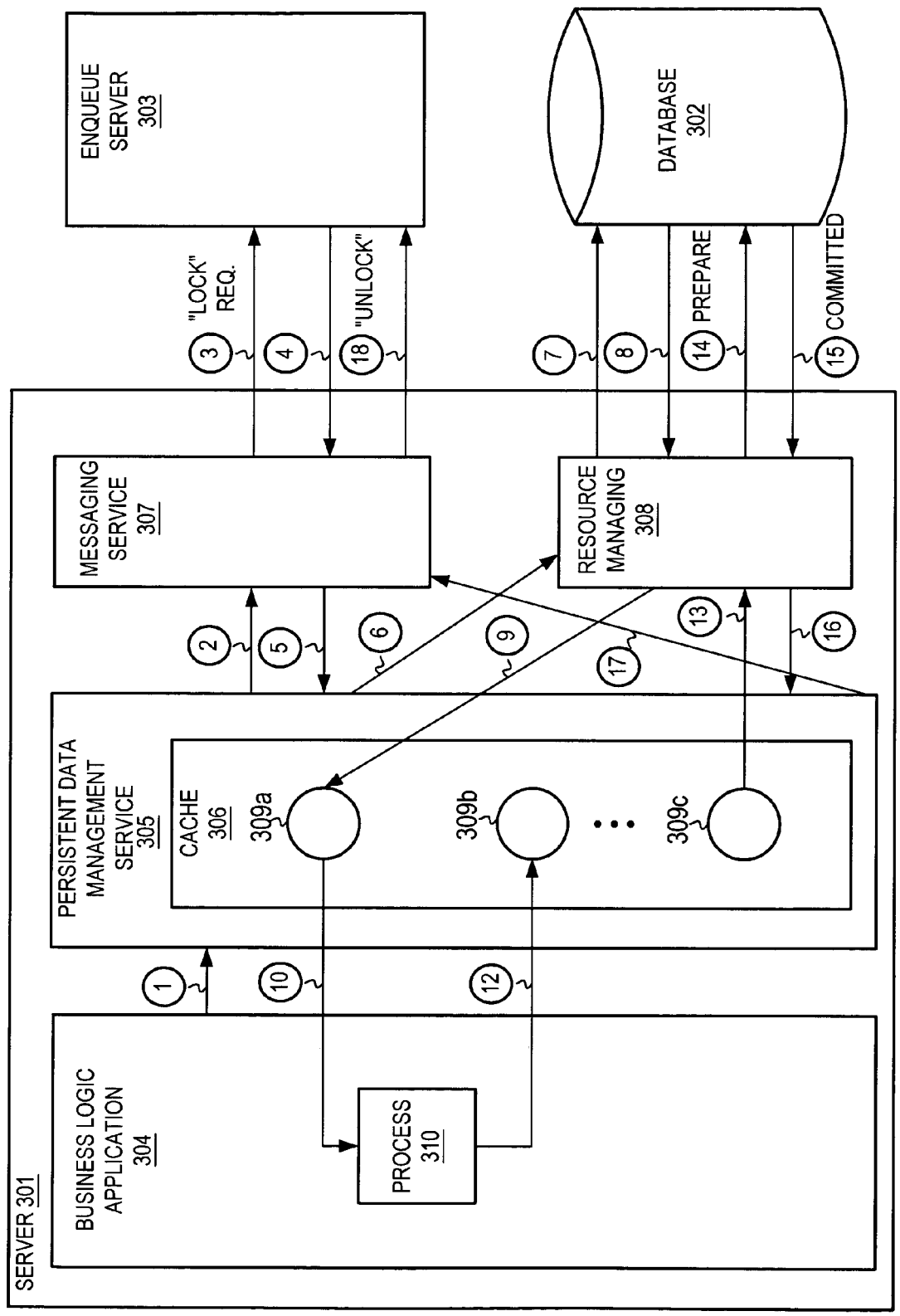
Figure 4:
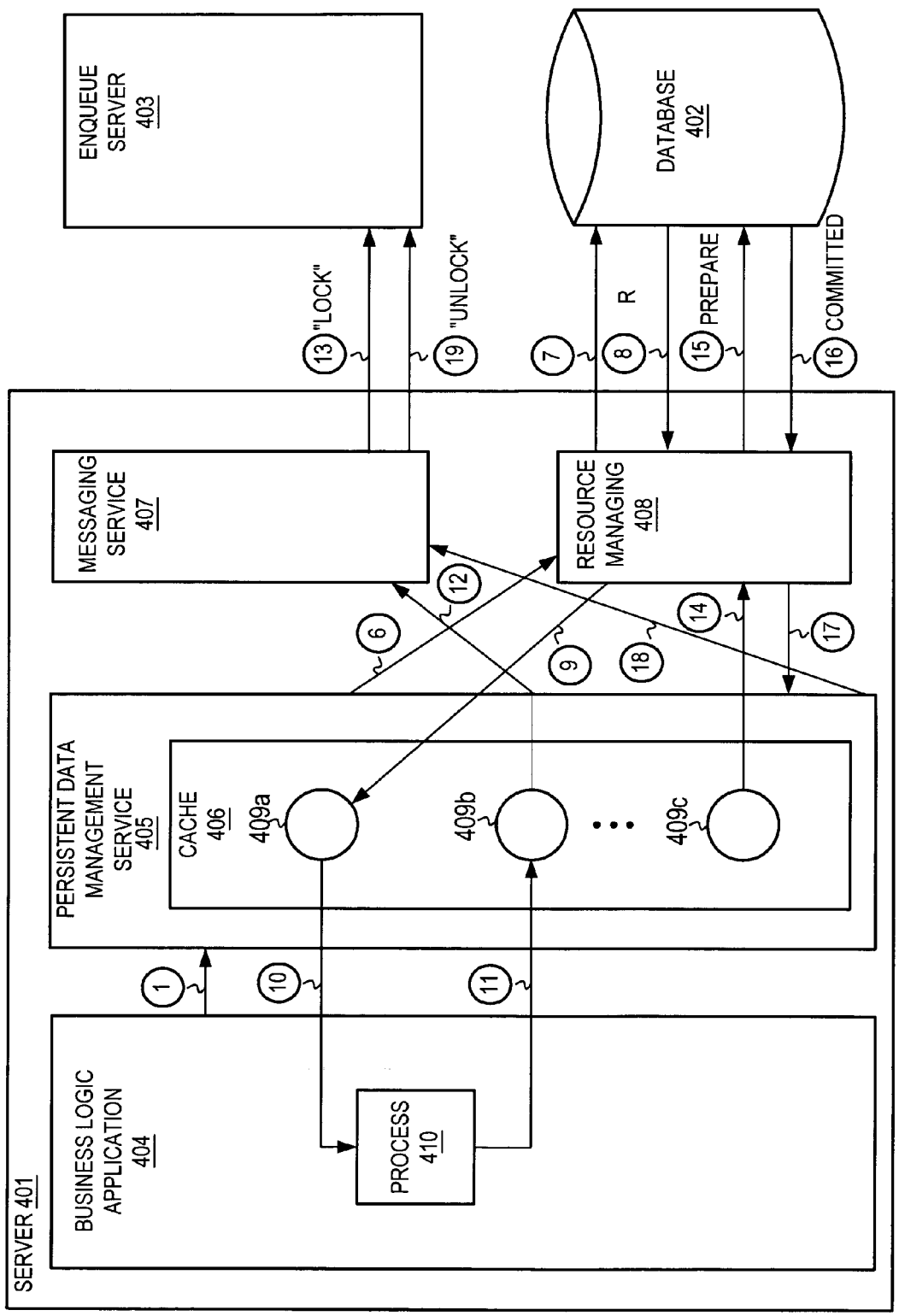
Figure 5:
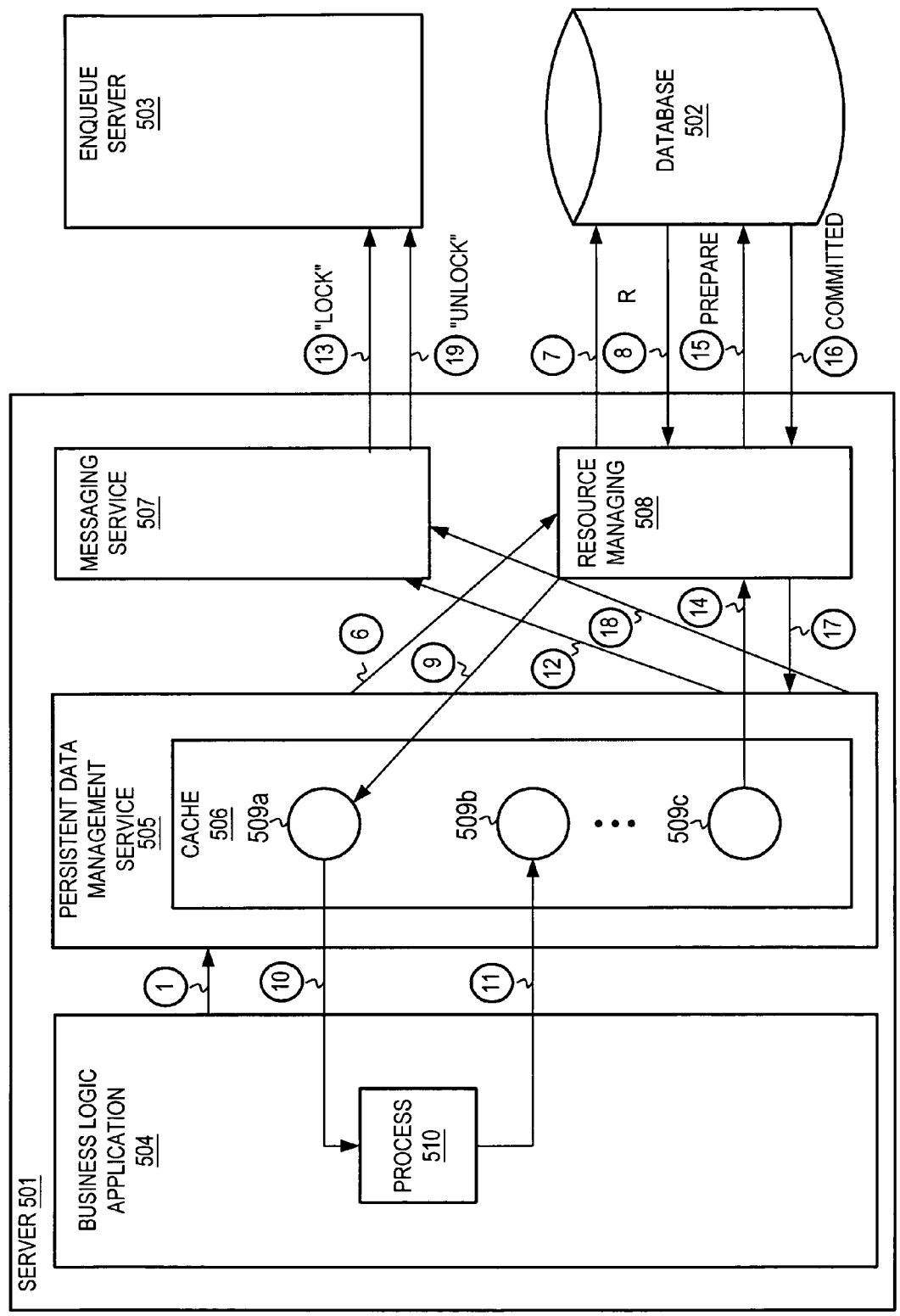
Figure 6:
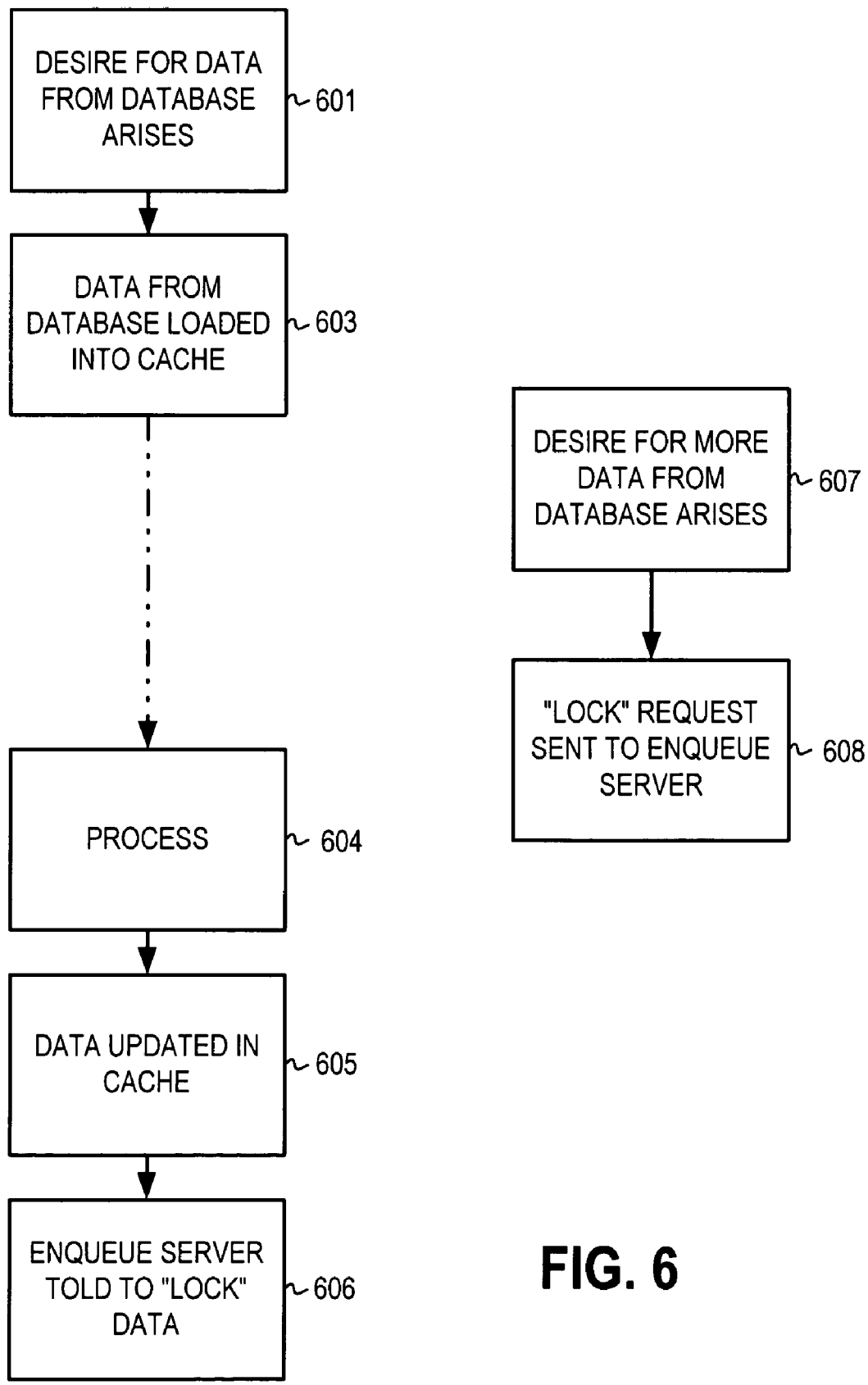
Figure 7:
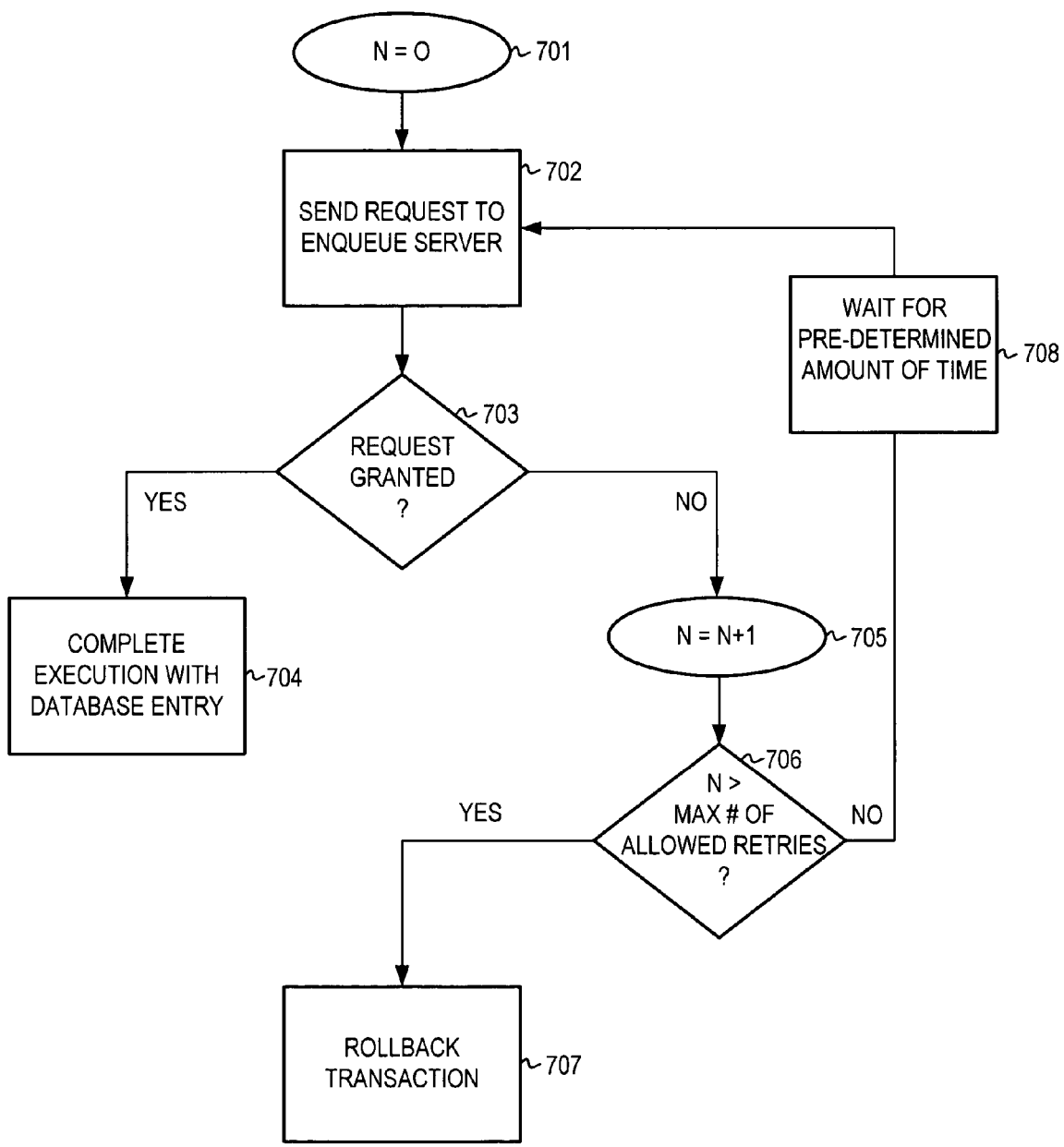
Figure 8:
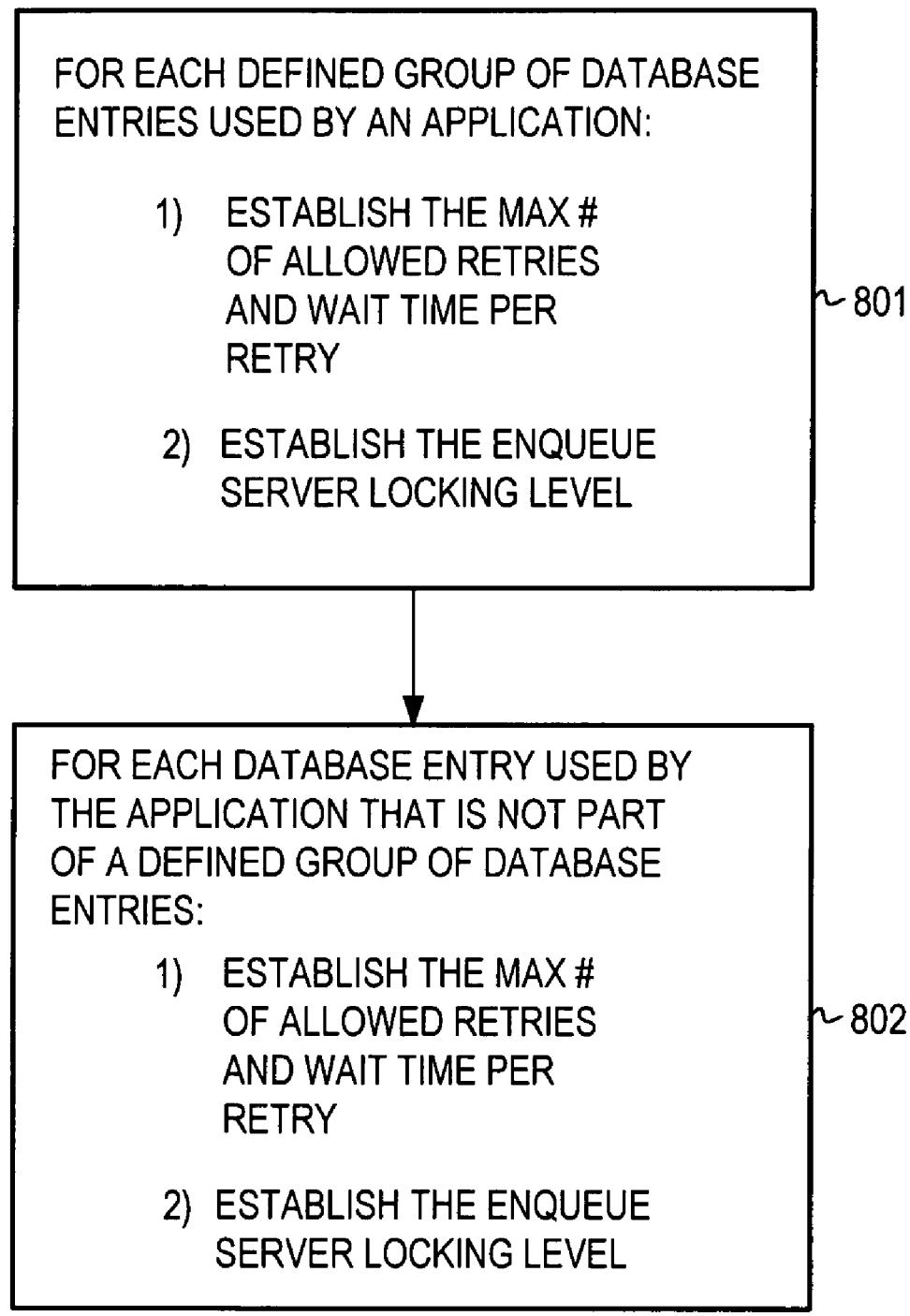
Figure 9:
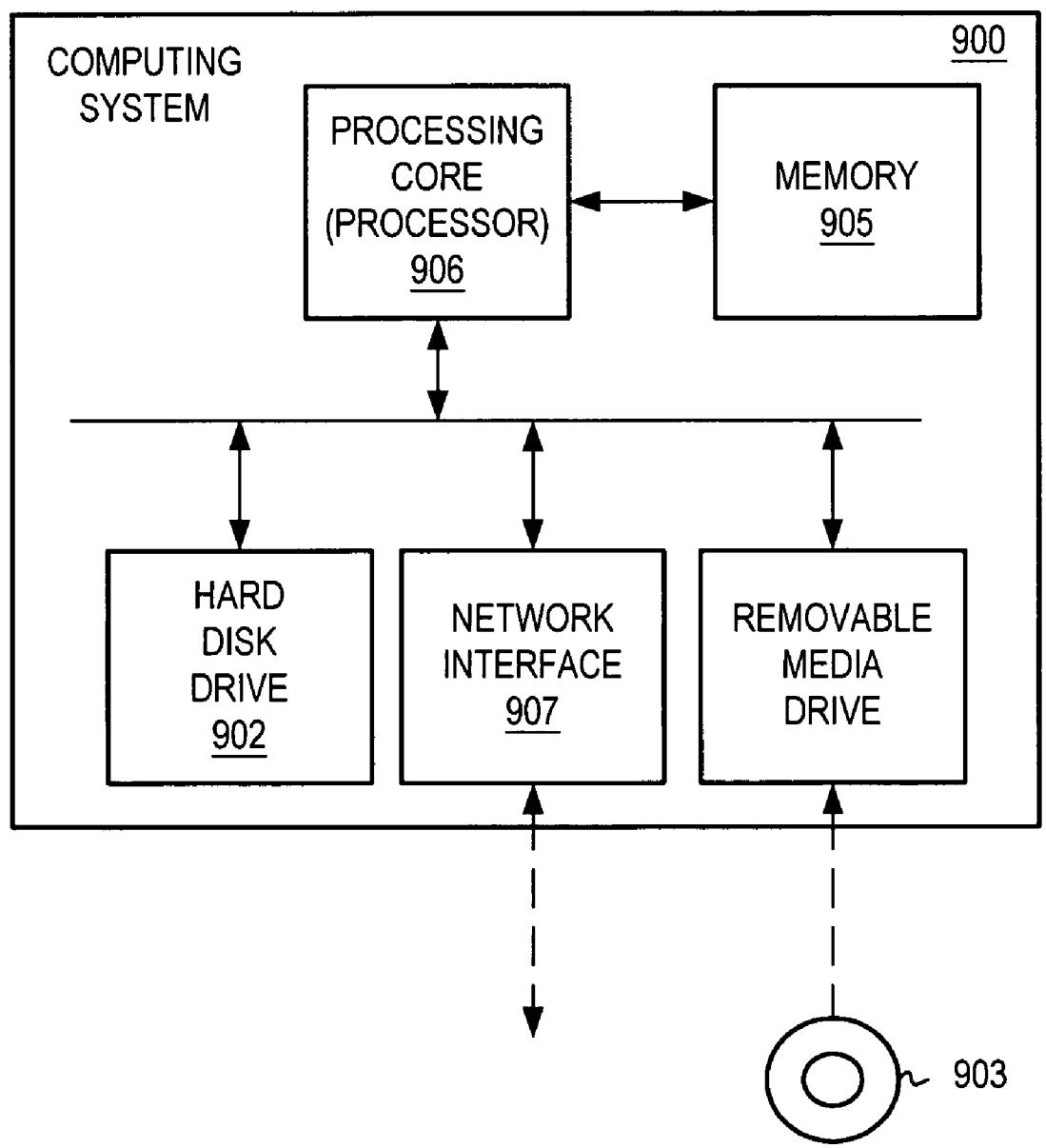

FIG. 3 relates to a first database entry locking scheme;

FIG. 4 relates to a second entry locking scheme;

FIG. 5 relates to a third database entry locking scheme;

FIG. 6 shows a possible sequence of processes executed for a single application that uses multiple database entries managed with different locking schemes;

FIG. 7 shows a methodology for handling an "exception" from an enqueue server;

FIG. 8 shows a methodology for implementing different exception handling treatment and locking schemes across different database entry groups and entries for those database entries used by a particular application;

FIG. 9 shows an embodiment of a computing system.

DETAILED DESCRIPTION

There may exist a tradeoff between performance and the degree to which a database entry that has been granted to a particular application is isolated from another application. For example, access to database entries based upon a strictly serialized (FIFO) scheme may result in reduced performance in some circumstances. Consider a situation where a conflict exists between a first application that requests access to a database entry even though the database entry may not actually be used and modified by the first application (e.g., the first application reads from the database, at the start of its execution, all of the database data that it "might" actually use) and a second application that will actually use the same database entry upon its request for it (e.g., an application that requests a read for a database entry just before it actually uses it).

Figure 1A:
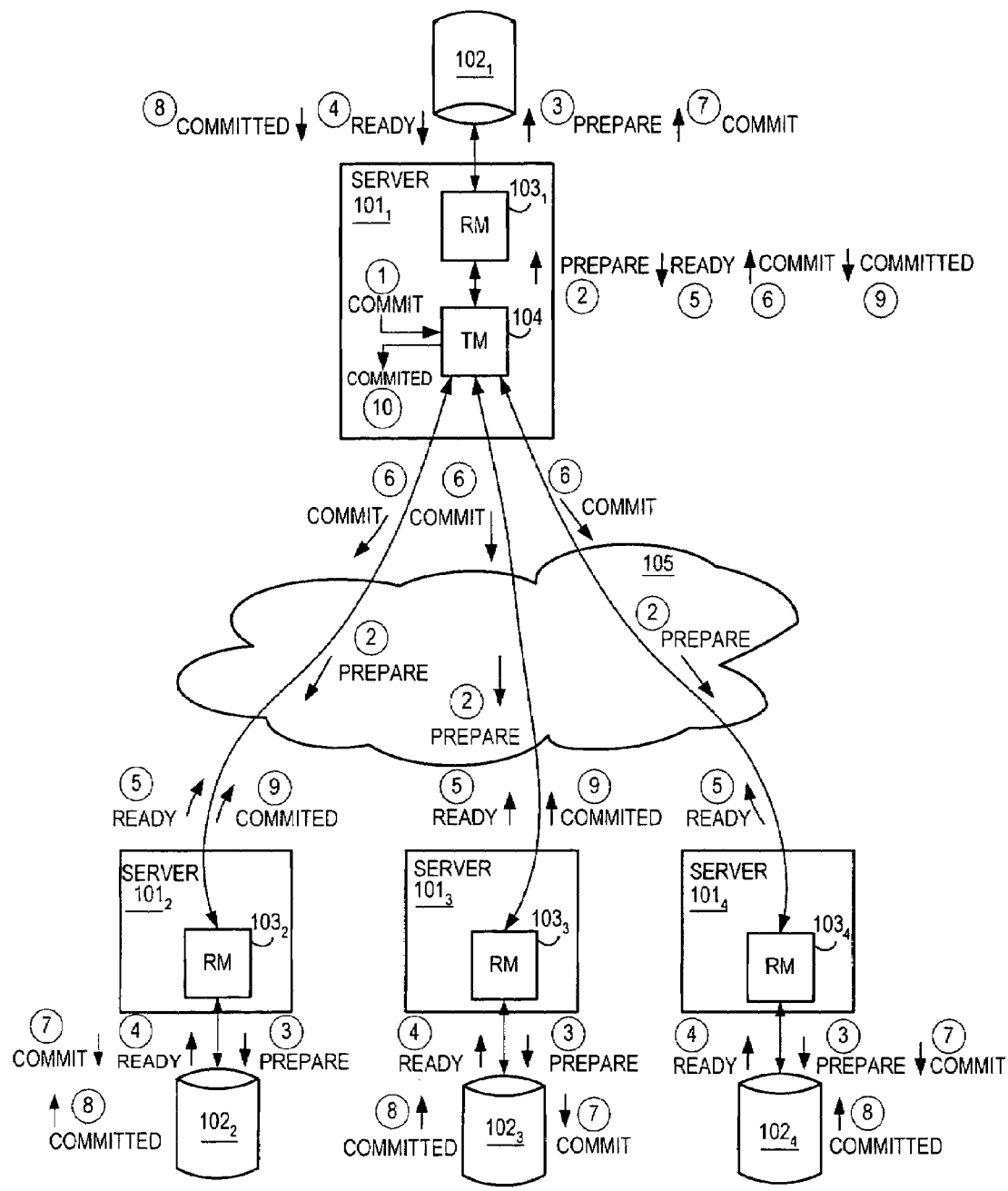
FIG. 1a (prior art) shows a two phase commit protocol distributed transaction that concludes with all updates being made to their respective databases.
Figure 1B:
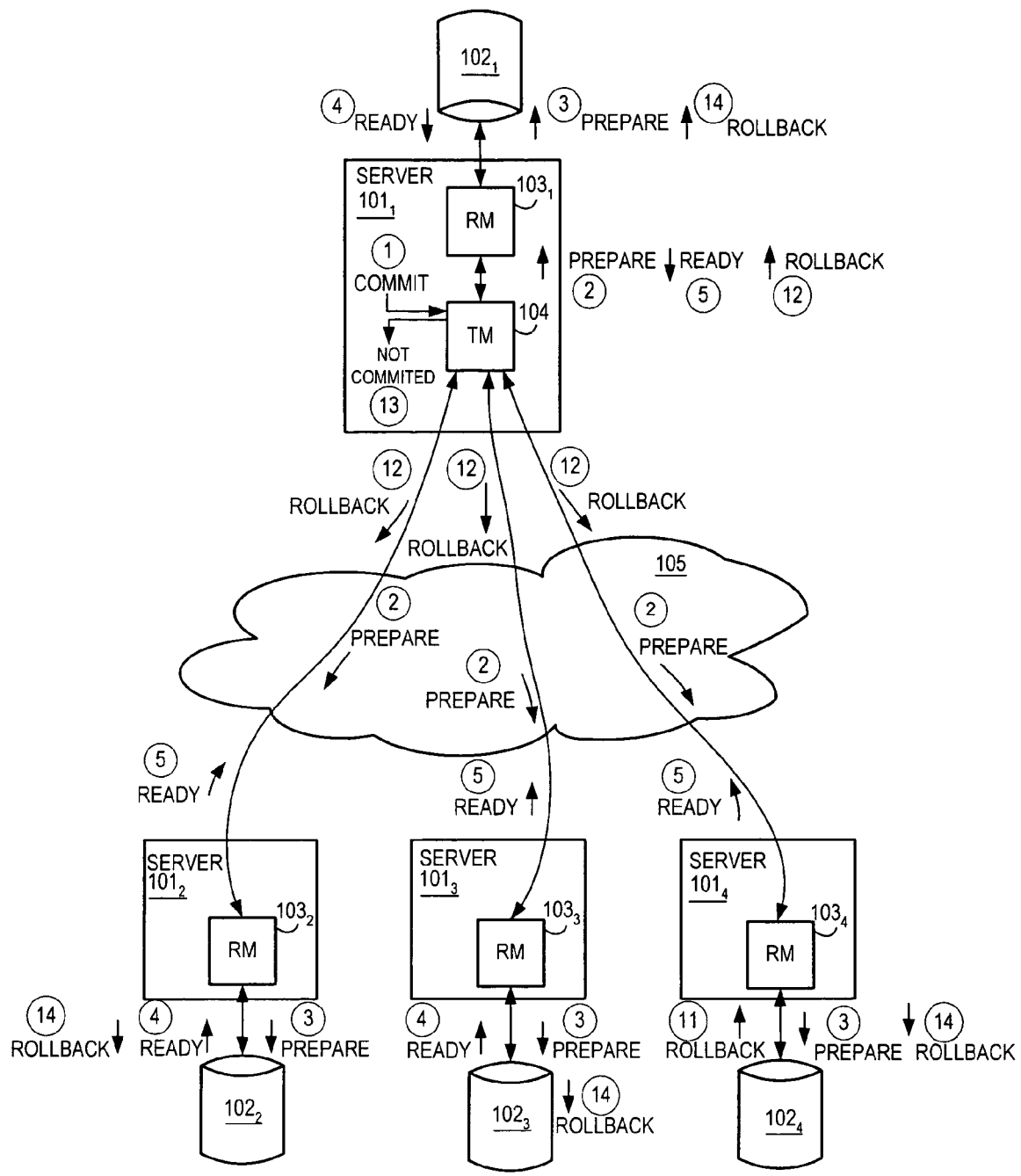
FIG. 1b (prior art) shows a two phase commit protocol distributed transaction that concludes with no updates being made to any databases.
Figure 2:
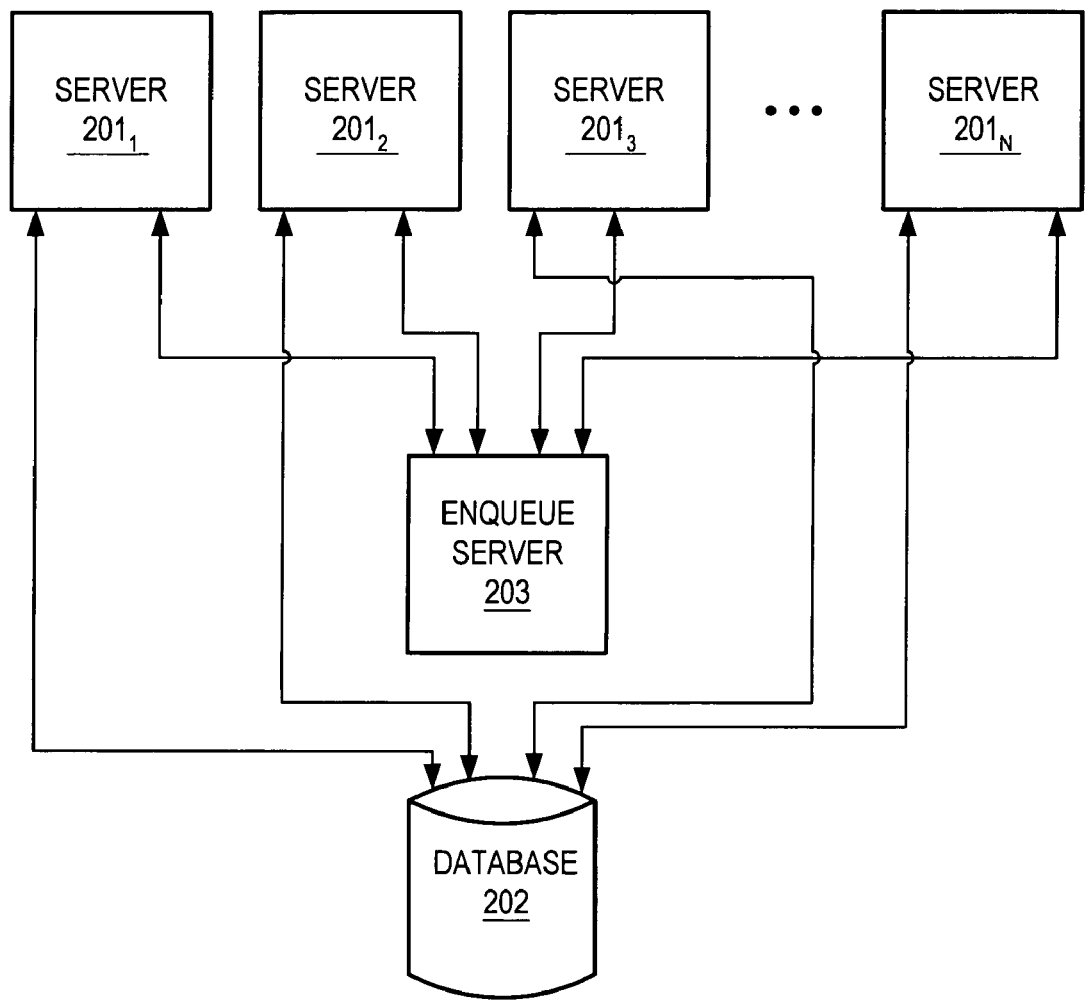
FIG. 2 shows a "multi-server, single database" environment having an enqueue server to resolve database contention issues.

Referring to FIG. 2, if the enqueue server 203 where to grant permissions to database data according to a strictly serialized scheme, and if the first application where to just barely precede the second application in requesting the same database entry, overall performance would be substantially degraded if the first application never used the contended for database entry. That is, for example, a distributed transaction comprised of the second application would be rolled back even though another distributed transaction comprised of the first application never used the database entry at issue.

In order to improve performance, therefore, it may be useful at least in some operational circumstances to allow another application to be granted access to a database entry even though another application already has access to it. According to the example provided immediately above, granting the second application access to the database entry at issue would have been beneficial from a performance perspective because both distributed transactions would have been able to successfully complete their execution (i.e., the second application's distributed transaction would not be rolled back).

A database entry is data that can be particularly requested from a database (e.g., one or more table rows, one or more table columns, a scalar table value, etc.). A database entry isolation level is a rule that dictates when a competing application is not allowed access to a database entry. That is, a database entry isolation level corresponds to when a database entry is "locked" such that applications requesting the database entry will be given an "exception" response by the enqueue server.

Defining isolation levels that are tailored for particular operational circumstances should allow for granularized consideration of performance vs. isolation level throughout an application's execution. A component of granularized performance vs. isolation level consideration would be to allow a specific isolation level to be selected (from amongst a collection of isolation level choices) for each of a particular application's database entries and/or group of database entries. That is, because different operational circumstances can be gleaned at least from the manner in which an application uses the database entries or groups thereof that it reads from a database, granularized consideration of isolation level vs. performance may be realized by defining isolation level on a database entry by database entry basis (and/or group of database entries by group of database entries basis).

For example, a "less strict" isolation level may be defined for a first database entry that "might be" used by an application only after a long period of time has elapsed after it has been read from the database. Likewise, for the same application, a "more strict" isolation level may be defined for a second database entry that "will be" used immediately after it is read from the database. FIGS. 3 through 5 disclose different isolation level techniques that may be applied to individual database entries and/or groups of database entries for a particular application.

The strictness of the disclosed isolation levels decreases from FIG. 3 to FIG. 5. A discussion of FIGS. 3 through 5 immediately follows. It is envisioned that in at least one implementation family, database entries correspond to entity beans in a Java based (e.g., J2EE) environment where entity beans include one or more objects that represent a database entry that are operated upon with session beans within the confines of an Enterprise Java Beans (EJB) container. As such, each the cached database entries 309, 409, 509 of FIGS. 3 through 5 may be viewed as at least one object of an entity bean when relating the teachings of FIGS. 3 through 5 to a Java based environment (or, more generally, as at least one object within an object oriented software environment).

FIGS. 3 through 5 also show application software 304, 404, 504 accessing cached data entries through a persistent data management service 305, 405, 505. Here, because the present discussion conveys the idea that different isolation levels can be applied to different database entries used by a same application, applications 304, 404 and 504 can be viewed as the same application and persistent data management service 305, 405, 505 can be viewed as the same persistent data management service. Also, likewise, server 301, 401, 501; database 302, 402, 502; and enqueue server 303, 403, 503 can be viewed as the same server, database and enqueue server, respectively.

Server 301, 401, 501 may be a Java 2 Enterprise Edition ("J2EE") server node which supports Enterprise Java Bean ("EJB") components and EJB containers (at the business layer) and Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

A persistent data management service can be viewed, at least in one instance, as a "faster" database because it utilizes storage elements (e.g., semiconductor memory) that are integrated closer to the processors that execute the application software than the actual database 302, 402, 502 itself. These proximate storage elements are generally referred to as a cache 306, 406, 506. Here, the application uses the persistent data management service largely as it would an external database (e.g., requesting database entries and updating database entries).

The persistent database management service manages cached database entries and communicates with the enqueue server 303, 403, 503 and external database 302, 402, 502 to read/write database entries from database 302, 402, 502 from/to cache 306, 406, 506. Because the function of the persistent data management service 305, 405, 505 is heavily involved with cached information, for illustrative convenience, cache 306, 406, 506 is drawn as being part of the persistent data management service 305, 405, 505 itself. Cache 306, 406, 506 can also be viewed as being the same cache.

According to the particular embodiment of FIGS. 3 through 5, the enqueue server 303, 403, 503 is communicated to through a messaging service 307, 407, 507 and the external database 302, 402, 502 is communicated to through a resource manager 308, 408, 508. In a Java based implementation, the messaging service may be implemented as a Java Messaging Service (JMS) and the resource manager may be implemented as a JDBC service. Each of the JMS and JDBC services are currently implemented as standard services available to an EJB container. A messaging service is a module of software that is responsible for the handling of sending/receiving messages between computing systems. A resource manager, as described in the background, is a module of software that is responsible for handling the communications to/from a database. Again, messaging service 307, 407, 507 and resource manager 308, 408, 508 can be viewed as the same messaging service module and the same resource manager module, respectively.

It is important to emphasize that the cached data entries and various software components of FIGS. 3 through 5 need not be implemented in Java based environments. Other software environments (e.g., Microsoft based software environments such as .NET) may make use of defining isolation levels for database entries on an entry by entry basis (and/or group of entries by group of entries basis) for a particular application so as to better granularize the manner in which its performance vs. isolation level tradeoffs are addressed.

The isolation level of FIG. 3 corresponds to a "strict serialized" isolation level in which a database entry is locked by the enqueue server 303 when a request for the database entry is initially submitted to the enqueue server 303. Referring to FIG. 3, some indication initially arises that the application 304 desires access to a database entry. FIG. 3 shows an example of such an indication in the form of a request 1 made by the application 304 to the persistent data management service 305 for a specific database entry. With the desired database entry not being in cache 306, the persistent data management service 305 causes a request 3 to be sent to the enqueue server 303 (by invoking 2 the messaging service 307).

The persistent data management service 305 causes the request 3 that is sent to the enqueue server 303 to indicate that the desired database entry is to be immediately locked (so that other applications are denied access to it) if the enqueue server favorably responds to the request. Accordingly, a favorable response 4 to the request 3 is sent by the enqueue server 303 and the enqueue server locks the database entry (e.g., by listing it with those database entries deemed accessed by an application and therefore not available for the use of other applications). In response to its receipt of the favorable response 5, the persistent data management service 305 causes a read command 7 (e.g., in an SQL format) to be sent to the database 302 (by communicating 6 to the resource manager 308).

The database 302 provides 8 the desired database entry 309a, which is subsequently loaded 9 into cache 306. The persistent database management service 305 is then able to respond to the application's initial request 1 by providing 10 the desired database entry 309a. At some later time the application may process the data 310 and cause it to be restored in cache 12 as database entry 309b (note that database entry 309b may be "updated" by the application's processing 310 so as to contain one or more different values than it did prior to the application's processing 310).

The application 304 then continues its execution until completion. The application 304 may or may not involve or update the cached database entry in any of its executions subsequent to processing 310 and prior to the application's completion. Cached database entry 309c corresponds to the database entry at issue at the time the application's execution is complete. Some time after the application's execution is complete, if the cached database entry 309c corresponds to updated information that differs from the information contained in its originally loaded state 309a, the updated database entry 309c will need to written back to database 302 as part of the two-phase commit protocol of the distributed transaction that application 304 was executed in support of.

As such, the updated database entry 309c is forwarded from the cache 306 to the database 302. Note that the process of FIG. 3 shows the updated database entry 309c being forwarded 13 from the cache 306 by the persistent data management service 305 to the resource manager 308. The resource manger 308, in response, sends the updated database entry to the database 302 with a "prepare" command or equivalent 14. For illustrative ease, the database's "ready" response and the "commit" command that is sent to the database as part of the two-phase commit protocol's execution are not shown in FIG. 3. Upon receipt of the "commit" command by the database 302, the database 302 responds with a "committed" message 15 indicating that the updated information has been successfully written into the database 302.

Upon notice 16 of the committed message 15, the persistent data management service causes 17 a message to be sent 18 to the enqueue server 303 that causes the enqueue server 303 to remove the lock on the database entry. At this point, other applications will be allowed to gain access to the database entry.

The isolation level of FIG. 4 corresponds to an isolation level that locks a database entry in response to its first cached update after it has been read from the database. Referring to FIG. 4, like FIG. 3, some indication initially arises 1 that the application 404 desires access to a database entry. However, unlike the approach of FIG. 3, no request or indication is made to the enqueue server 403. Here, the enqueue server 403 is understood to entertain "lock" and "unlock" requests. Since data is desired from database 402 that will only be locked if it is updated after it has been read from the database, no purpose is served in engaging the enqueue server 403 (i.e., it is premature to send a "lock" request to the enqueue server).

As a consequence, in response to the indication 1 that the application 404 desires access to the database entry, the persistent data management service 405 simply causes a read command 7 (e.g., in an SQL format) for the database entry to be sent to the database 402 (by communicating 6 to the resource manager 408).

The database 402 provides 8 the desired database entry 409a, which is subsequently loaded 9 into cache 406. The persistent database management service 405 is then able to respond to the application's initial request 1 by providing 10 the desired database entry 409a. At some later time the application may process the data 410 and cause it to be restored in cache 11 as database entry 409b. If the database entry 409b is updated by the application's processing 410 so as to contain one or more different values than it did prior to the application's processing 410, the persistent data management service causes 12 a message to be sent to the enqueue server 403 that commands the enqueue server to lock the database entry 13.

Here, note that another application may or may not have obtained access to the database entry in the time period between the read command 7 for the database entry on behalf of the application 404 and the receiving of the lock message by the enqueue server 13. If another application has not requested access to the database entry there is no issue—the database entry is locked by the enqueue server 403 for the use of application 404. If another application has requested access to the database entry, there exists "a race to lock". That is, the first application to reach the enqueue server 403 with a lock message is deemed the owner of the database entry that is being competed for. All later competing applications that outright request to read or write to the database entry or request a lock on the database entry are somehow informed that the database entry is presently not available for use.

If a "race to lock" exists, in one embodiment, the enqueue server 403 either sends a favorable response to the locking message 13 if the application 404 is the first to request a lock; or, sends an "exception" message (or some other form of rejection) in response to the locking message 13 if the application 404 is not the first to request a lock (for ease of drawing, neither the favorable response nor the exception message are observed in FIG. 4). If a favorable response is received, the application 404 and its corresponding distributed transaction is allowed to continue forward. If an exception message is received, the application 404 and its corresponding distributed transaction is at least suspended until sometime after the lock is removed from the database entry—if not rolled back entirely. More discussion as to how such an exception message might be handled is provided ahead with respect to FIG. 7.

The remainder of the discussion of FIG. 4 assumes that a favorable response was given to the locking request 13 such that the application is allowed to continue until completion. The application 404 may or may not involve or update the cached database entry 409b in any of its executions subsequent to processing 410 and prior to the application's completion. Cached database entry 409c corresponds to the database entry at issue at the time the application's execution is complete. Some time after the application's execution is complete, if the cached database entry 409c corresponds to updated information that differs from the information contained in its originally loaded state 409a, the updated database entry 409c will need to written back to database 402 as part of the two-phase commit protocol of the distributed transaction that application 404 was executed in support of.

As such, the updated database entry 409c is forwarded from the cache 406 to the database 402. Note that the process of FIG. 4 shows the updated database entry 409c being forwarded 14 from the cache 406 by the persistent data management service 405 to the resource manager 408. The resource manger 408, in response, sends the updated database entry to the database 402 with a "prepare" command or equivalent 15. For illustrative ease, the database's "ready" response and the "commit" command that is sent to the database as part of the two-phase commit protocol's execution are not shown in FIG. 4.

Upon receipt of the "commit" command by the database 402, the database 402 responds with a "committed" message 16 indicating that the updated information has been successfully written into the database 402. Upon notice 17 of the committed message 16, the persistent data management service causes 18 a message to be sent 19 to the enqueue server 403 that causes the enqueue server 403 to remove the lock on the database entry. At this point, other applications will be allowed to gain access to the database entry.

The isolation level of FIG. 5 corresponds to an isolation level that locks a database entry in response to its final cached update after it has been read from the database. Referring to FIG. 5, like FIGS. 3 and 4, some indication initially arises 1 that the application 504 desires access to a database entry. Similar to the approach of FIG. 5, with the desired database entry not being in cache 506, the persistent data management service 505 simply causes a read command 7 for the database entry (e.g., in an SQL format) to be sent to the database 502 (by communicating 6 to the resource manager 508).

The database 502 provides 8 the desired database entry 509a, which is subsequently loaded 9 into cache 506. The persistent database management service 505 is then able to respond to the application's initial request 1 by providing 10 the desired database entry 509a. At some later time the application may process the data 510 and cause it to be restored in cache 11 as database entry 509b. The application 504 then continues to run until completion. The state of the database entry at the time of completion is illustrated as cached database entry 509c.

If at the time of the application's completion, the cached database entry 509c corresponds to updated information so as to contain one or more different values than it did as compared to its initial cached state 509a, the persistent data management service 505 causes 12 a message to be sent to the enqueue server 503 that commands the enqueue server to lock the database entry 13.

Here, note that another application may or may not have obtained access to the database entry in the time period between the sending of the read command 7 and the receiving of the lock message by the enqueue server 13. If another application has not requested access to the database entry there is no issue—the database entry is locked by the enqueue server 503 for the use of application 504. If another application has requested access to the database entry, there exists "a race to lock". As discussed with respect to FIG. 4, the first application to reach the enqueue server 503 with a lock message is deemed the owner of the database entry that is being competed for. All later competing applications that request the database entry outright or request a lock on the database entry are somehow informed that the database entry is presently not available for use.

Again, if a "race to lock" exists, in one embodiment, the enqueue server 503 either sends a favorable response to the locking message 13 if the application 504 is the first to request a lock; or, sends an "exception" message (or some other form of rejection) in response to the locking message 13 if the application 504 is not the first to request a lock (for ease of drawing, neither the favorable response nor the exception message are observed in FIG. 5). If a favorable response is received, the two phase commit protocol for the distributed transaction supported by application 504 is allowed to continue forward. If an exception message is received, the two-phase commit protocol is at least suspended until sometime after the lock is removed from the database entry; or, the entire distributed transaction is rolled back. More discussion as to how such an exception message might be handled is provided ahead with respect to FIG. 7.

The remainder of the discussion of FIG. 5 assumes that a favorable response was given to the locking request 13 such that the two phase commit protocol is allowed to be performed without further delay. As the updated database entry 509*c* needs to be written back to database 502 as part of the two-phase commit protocol, the updated database entry 509*c* is forwarded from the cache 506 to the database 502. Note that the process of FIG. 5 shows the updated database entry 509*c* being forwarded 14 from the cache 506 by the persistent data management service 505 to the resource manager 508.

The resource manger 508, in response, sends the updated database entry to the database 502 with a "prepare" command or equivalent 15. For illustrative ease, the database's "ready" response and the "commit" command that is sent to the database as part of the two-phase commit protocol's execution are not shown in FIG. 5. Upon receipt of the "commit" command by the database 502, the database 502 responds with a "committed" message 16 indicating that the updated information has been successfully written into the database 502. Upon notice 17 of the committed message 16, the persistent data management service causes 18 a message to be sent 19 to the enqueue server 503 that causes the enqueue server 503 to remove the lock on the database entry. At this point, other applications will be allowed to gain access to the database entry.

In considering the discussions of FIGS. 3 through 5, it is clear that the isolation level disclosed by FIG. 3 and its corresponding discussion corresponds to the most severe isolation with potentially the most severe hit against performance. If the cached database entry 309 is never updated by application 304, inefficiency may result because all other competing applications would have been blocked from using the database entry the moment the request 3 for the database entry was made. The isolation level disclosed by FIG. 4 and its discussion effectively cures this performance impact by triggering a lock on whether or not the cached database entry is updated with new information. The isolation level disclosed by FIG. 5, which also triggers a lock on whether or not an update has actually been made, is useful at least for those database entries that have some not insubstantial likelihood of being "flipped back" to the value of their initial state 509*a* even if they are updated 509*b* at some earlier point in the application.

It is also important to re-emphasize that the database entries 309, 409, 509 referred to in regard to the discussions of FIGS. 3, 4 and 5 may be groups of database entries rather than single database entries. Loading groups of database entries may come in useful, for example, in situations where the persistent data management service attempts to behave as a relational database where a first database entry has a relationship to another database entry (e.g., a first database row includes a primary key that points to a second database row).

By loading the first and second database entries together into cache, the persistent data management service would be able to quickly perform a lookup from the first database entry to the second database entry in emulating a relational database. Here, according to the isolation level technique of FIG. 3, the entire group of database entries would be locked with the initial request message 3. According to the techniques of FIGS. 4 and 5, the entire group may be locked upon an update to any member of the group; or, only the updated member of the group is locked.

It also warrants reemphasis that isolation levels may be articulated for different database entries and/or groups of database entries within a single application. In an embodiment, an application is configured to define an isolation level for database entries and/or groups of database entries that it uses. In another embodiment, the isolation level for specific database entries and/or groups of database entries are defined and respected globally across all applications. For example, a descriptor or some other attribute of a database entry defines its isolation level. The isolation level therefore "follows" its database entry across the various uses of it by different applications. Here, note that it is possible that for the request based locking scheme of FIG. 3 that a request to lock need not be sent to the enqueue server 303 along with the request for the database entry 3 if the enqueue server is already aware of the requested database entry's defined isolation level.

Regardless, FIG. 6 demonstrates a property of entry-by-entry isolation level isolation within a single application. Specifically, a first database entry that was loaded into cache before a second database entry may be locked later the second database entry. FIG. 6 shows strings of processes pertaining to different database entries. Specifically, the processing string made up of processes 601 through 606 illustrate the processing performed for a first database entry; and, the processing string made up of processes 607 and 608 make up the processing performed for a second database entry. Both processing strings are directed to the execution of a single application.

It is apparent that the first processing string 601-606 may correspond to either of the update based locking schemes disclosed in FIGS. 4 and 5; and, that the second processing string 607-608 may be directed to the initial request based locking scheme disclosed in FIG. 3. Here, the second database entry is locked 608 before the first entry 606 (because the second database entry is locked upon the initial request for it) even though the need for second database entry arose 607 after the need for the first database entry 601.

The discussions above have been primarily directed to isolation levels for database entries. Recall that if the enqueue server receives a request to lock a database entry that is already locked, the enqueue should respond with an "exception" message that indicates the database entry is already locked. FIG. 7 is devoted to a methodology that describes how an application may be designed to respond to an exception. According to the methodology of FIG. 7, the application is presumed to have been configured with a maximum number of retries and a time period between consecutive request attempts.

A retry is a "re-attempt" in requesting access to a database entry. According to the methodology of FIG. 7, the request that is sent to the enqueue server 702 corresponds to the request to lock that is sent at moment 3 in FIG. 3 and each of moments 13 in FIGS. 4 and 5. If the request is granted 703, processing continues as described for each of FIGS. 3, 4 and 5 irrespective of whether the applicable locking policy corresponds to that described in FIG. 3, 4 or 5. If the request is not granted 703 (e.g., an exception message is received), the maximum number of permissible retries is inquired into 706 and if the maximum number of retries is greater than zero, a first retry (i.e., a second request attempt) is made after the set time period between consecutive request attempts elapses 708, 702. If the isolation level is that as described with respect to FIG. 3, a retry simply corresponds to a delay before access to the database entry is first obtained for the application. If the isolation level is that as described in FIGS. 4 and 5, a retry means that the persistence data management service has to reload the data entry from the database into cache and that the application may have to "re-perform" its operations with the reloaded database entry (which is particularly likely if: 1) there is a difference between its value(s) when it was first loaded into cache and its value(s) when it was again loaded into cache; and, 2) correct functioning of the application depends upon the database entry being "up-to-date"). Note that a parameter N is used to keep track of how many retries have been attempted 701, 705.

Successive loops through processes 702, 703, 705, 706, 708 continue until the maximum number of retries is reached or a request is accepted. If a request is accepted 703, execution is completed with the database entry. Here, if the isolation level is that as described with respect to FIG. 3, the database entry is fetched from the database 704; or, if the isolation level is that as described with respect to FIG. 4, the application is allowed to complete (as far as its dependence on the database entry at issue goes); or, if the isolation is as described with respect to FIG. 5, the two-phase commit protocol is allowed to be executed.

If the maximum number of retries is reached 706 the distributed transaction that desires access to the database entry is rolled back 707. In one embodiment, the methodology is controlled by the application. In another embodiment the methodology of FIG. 7 is controlled by the persistent data management service upon its being informed (e.g., by the application) of the maximum number of retries and the time between consecutive requests. The methodology of FIG. 7 may be executed on a per database entry or entry group basis (permitting different max retry and time period settings per entry or entry group) local to an application or global across various applications, or may be uniform for all database entries or groups of entries within an application (i.e., all database entries used by an application have the same settings).

FIG. 8 shows a methodology for setting configurations for database entries and/or groups of database entries used by an application. According to the methodology of FIG. 8, for each identified group of database entries (a group of rows in a database table) within an application: max retry and time period settings are established and an isolation level is established 801. Also, max retry and time period settings are established and an isolation level is established 802 for each singular, non grouped database entry (each single row in a database table) that is used by the application.

In various embodiments, a group of database entries are identified as being suitable for loading into cache from a database at approximately "the same time" as part of a read transaction from a database (i.e., a group of database entries are read as whole). Such instances can be used to define a same isolation level for each entry in the group. That is, groups of database entries that are to receive a same isolation level are identified from the fact that they are read from the database together.

Processes taught by the discussion above may be performed with program code such as machine-executable instructions which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodies as, but is not limited to, one or more memories (e.g., one or more flash memories, random access memories (static, dynamic or other)), optical disks, CD-ROMs, DVD ROMs, EPROMs, EEPROMs, magnetic or optical cards, or other type of machine-readable media suitable for storing electronic instructions.

FIG. 9 is a block diagram of a computing system 900 that can execute program code stored by an article of manufacture. It is important to recognize that the computing system block diagram of FIG. 9 is just one of various computing system architectures. The applicable article of manufacture may include one or more fixed components (such as a hard disk drive 902 or memory 905) and/or various movable components such as a CD ROM 903, a compact disc, a magnetic tape, etc. In order to execute the program code, typically instructions of the program code are loaded into the Random Access Memory (RAM) 905; and, the processing core 906 then executes the instructions.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A computer-implemented method for processing database entries by an application running on a computer, the application to apply locks on database entries and update the database entries in a database, the method comprising:

locking a database entry in the database in accordance with an assigned isolation level, wherein the assigned isolation level is selected from a group of isolation levels responsive to an analysis of the database entry and the group of isolation levels, the group of isolation levels consisting of:

a first isolation level to lock the database entry in the database responsive to receiving a read request for the database entry from the application;

a second isolation level to lock the database entry in the database if a first cached update of the database entry is different from a version of the database entry in the database; and a third isolation level to lock the database entry in the database if a last update of the database entry cached prior to completion of the execution of the application is different from the version of the database entry in the database;

wherein locking the database entry includes:

requesting a lock for the database entry;

receiving a lock for the database entry if the database entry is not already locked in response to a previous request;

receiving an exception in response to the lock request if the database entry is already locked in response to another request; and for each exception, repeating the lock request for the database entry until either the lock is received or a specified number of retries is reached;

and updating the database entry in the database after completion of the execution of the application by replacing the database entry in the database with the last cached update of the database entry.

2. The method of claim 1, further comprising:

establishing a maximum number of retries and a periodic retry time interval for each further lock request for the database entry.

3. The method of claim 2, wherein establishing the maximum number of retries is performed at application configuration time.

4. An article of manufacture, comprising a machine readable medium having instructions therein that when executed by a machine, configure the machine to:
   lock a database entry in the database in accordance with an assigned isolation level, wherein the assigned isolation level is selected from a group of isolation levels responsive to an analysis of the database entry and the group of isolation levels, the group of isolation levels consisting of:
      a first isolation level to lock the database entry in the database responsive to receiving a read request for the database entry from the application;
      a second isolation level to lock the database entry in the database if a first cached update of the database entry is different from a version of the database entry in the database; and
      a third isolation level to lock the database entry in the database if a last update of the database entry cached prior to completion of the execution of the application is different from the version of the database entry in the database;
   wherein instructions configuring the machine to lock the database entry include:
      requesting a lock for the database entry;
      receiving a lock for the database entry if the database entry is not already locked in response to a previous request;
      receiving an exception in response to the lock request if the database entry is already locked in response to another request; and
      for each exception, repeating the lock request for the database entry until either the lock is received or a specified number of retries is reached;
   and
   update the database entry in the database after completion of the execution of the application by replacing the database entry in the database with the last cached update of the database entry.

5. The article of manufacture of claim 4, further comprising instructions that configure the machine to establish a maximum number of retries and a periodic retry time interval for each further lock request for the database entry.

6. The article of manufacture of claim 5, wherein instructions causing the machine to establish a maximum number of retries, cause the machine to establish the maximum number of retries at application configuration time.

7. A computerized system including a processor, the processor communicating with a memory storing instructions for processing database entries by an application running on a computer, the application to apply locks on database entries and update the database entries in a database, comprising:
   an enqueue service to lock the database entry in the database in accordance with an assigned isolation level;
   a persistent data management service comprising a cache, the persistent data management service to request a database entry from a database responsive to receiving a request for the database entry from the application and store the database entry in the cache, the persistent data management service further to assign one of a set of different isolation levels to the database entry, wherein the assigned isolation level is selected from a group of isolation levels consisting of:
      a first isolation level to lock the database entry in the database responsive to receiving a read request for the database entry from the application;
      a second isolation level to lock the database entry in the database if a first cached update of the database entry is different from a version of the database entry in the database; and
   a third isolation level to lock the database entry in the database if a last update of the database entry cached prior to completion of the execution of the application is different from the version of the database entry in the database;
   and
   the persistent data management service to update the database entry in the database after the completion of the execution of the application by replacing the database entry in the database with the last cached update of the database entry.

8. The system of claim 7, further comprising:
   a messaging service to enable a communication between the enqueue sewer and the persistent data management service; and
   a resource manager to manage the communication between the database and the persistent data management service.

* * * * *

UNITED STATES PATENT AND TRADEMARK OFFICE
CERTIFICATE OF CORRECTION

PATENT NO. : 7,653,628 B2  Page 1 of 1
APPLICATION NO. : 10/836693
DATED : January 26, 2010
INVENTOR(S) : Manolov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 643 days.

Signed and Sealed this

Twenty-third Day of November, 2010

David J. Kappos
*Director of the United States Patent and Trademark Office*